United States Patent Office

3,379,696
Patented Apr. 23, 1968

3,379,696
SOLID STATE PREPARATION OF POLYAMIDES
Fritz Wiloth, Erlenbach am Main, Germany, assignor to Vereinigte Glanzstoff-Fabriken A.G., Wuppertal-Elberfeld, Germany
No Drawing. Filed Mar. 16, 1964, Ser. No. 352,363
Claims priority, application Germany, Apr. 26, 1963, V 23,987
2 Claims. (Cl. 260—78)

The present invention is directed to an improved process for the polycondensation of amino carboxylic acids, of dicarboxylic acids and diamines, and of salts of dicarboxylic acids and diamines.

In producing amides either by the self-condensation of amino acids or by the reaction of diamines with dicarboxylic acids, the amide is formed from the interaction of a carboxyl group with an amino group and with the elimination of water. Ordinarily, aqueous solutions of the salts of the monomers are used as the starting materials. It is known, however, that polyamides can be produced by the polycondensation of amide-forming compounds in the solid base. The reaction is conducted in such a manner that the reaction temperature is below the melting point of the starting materials, of the intermediate products, and of the end products.

In a typical prior art process carried out in the solid phase the salt formed from equimolecular amounts of adipic acid and hexamethylene diamine (AH salt) is heated in a carbon dioxide or nitrogen current for from 15 to 20 hours at 190° C. The removal of water produced in this process is accomplished by passing the gas current through the reaction mixture at normal pressure. For this reason it is necessary to compensate for or reduce the loss of the readily volatile diamine from the reaction composition. Several measures have been adopted for this purpose. Such measures include the addition to the reaction mixture of acid substances such as carbon dioxide, sulfuric acid anhydride, hydrogen chloride, etc.; the use of nitrogen gas containing hexamethylene diamine; and the return of the hexamethylene diamine carried along in the gas flow to the starting material feed line.

The known processes have serious drawbacks when used in commercial operations. Each of the measures mentioned above for the prevention of diamine losses is unsatisfactory. The contamination of the end products through the addition of acid compounds, for example, is extremely undesirable. Attempts to limit the loss of hexamethylene diamine by precipitating the diamine that is carried along in the gas flow and adding the precipitate to the starting material have not been successful because the starting material is agglutinated by the condensed and aqueous hexamethylene diamine. For this reason the flow of the starting materials is impeded to such an extent that special steps must be taken to overcome this problem. Finally, the retention of reaction temperatures during the entire process below or close to the melting temperature of the starting materials is a reason for the lengthening of the necessary reaction time.

It is an object of the present invention to provide an improved process for producing polyamides which avoids the problems disclosed above.

Other objects of the invention will become apparent to those skilled in the art from the following detailed description of the invention.

In general, it was found that the difficulties described above can be avoided and that considerable improvement can be achieved by carrying out the solid phase reaction in a particular manner. More specifically, it was found that greatly improved results are obtained if in the polycondensation of diamines and carboxylic acids or their salts or the self-condensation of amino carboxylic acids in the solid phase, the monomers are initially kept in a closed vessel under stationary nitrogen, preferably with stirring, for from 2 to 6 hours and preferably for 3 to 4 hours, at a temperature that is from about 10 to about 30° below the melting point of the monomers. In this step, a pressure of from about 13 to 15 atmospheres sets in and a precondensate is formed having a solution viscosity of about 1.30 to 1.50. Thereafter the pressure is released over a period of about 15 to 45 minutes, and preferably about 30 minutes down to a pressure slightly above atmospheric pressure (preferably to from about 1 atmosphere excess pressure to about 4 atmospheres excess pressure, and more preferably to about 2 atmospheres excess pressure); nitrogen is passed through the reaction mixture at said pressure slightly above atmospheric pressure and preferably at about 2 atmospheres excess pressure; the temperature of the reaction mass is increased to about 20 to 60° below the melting point of the end polycondensate; and condensation is continued for from 1 to 5 additional hours. A further improvement can be obtained if, after the termination of the polycondensation reaction, the cooling of the reaction mass to about 150° C. is carried out with further stirring and with additional passage of nitrogen through the reaction mixture.

Due to the well known sluggishness of reactions in solid phase, it was extremely surprising that at relatively low temperatures without the removal of the reaction water formed during the precondensation period, a precondensate was formed in a relatively short period of time having a molecular weight which was already so high that the reaction product contained virtually no free hexamethylene diamine.

In contrast to the prior art processes described above, the formation of the precondensate in the subject process is carried out in a closed vessel which prevents any loss of hexamethylene diamine. Inasmuch as a precondensate is produced during this first stage of the reaction having a sufficiently high mean molecular weight so that practically no free hexamethylene diamine is present, no appreciable diamine losses occur in the subsequent pressure release and nitrogen washing steps. The resulting polyamides, therefore, within the measurement error limits of the end-group determinations are practically end-group equivalent but, in any case, they are considerably better than in polyamides produced in the melt. In the subject process there is obtained in about 7 to 8 hours an end-group equivalent product having a solution viscosity which is higher than that obtained in the prior art processes, which require a reaction time of 15 to 20 hours. By determination of the ultraviolet (UV) absorption, it can further be demonstrated that the products produced according to the subject invention are thermally completely undamaged.

In contrast to the polycondensation processes which are ordinarily carried out on a commercial scale and in which the reaction mass is present in liquid form, the subject solid phase process is capable of producing polyamides having much higher molecular weights. While it is not possible with the usual polycondensation processes carried out in the melt (for example, utilizing an adipic acid-hexamethylene diamine salt) to produce polyamides having a solution viscosity of greater than 2.4 to 2.5, with the present process and utilizing about the same reaction period it is possible to obtain a solution viscosity of 2.7 and above. These values can be increased by the choice of temperature and the amount of washing nitrogen. By lengthening the precondensation time the molecular weight can be further increased, that is, by this measure polyamides can be obtained having still higher solution viscosity. Threads and films made from the polyamides produced by the subject invention are distinguished by their particularly high strengths.

In the examples which follow, the solution viscosity was measured in 1% solutions in 90% formic acid at 25° C. in a capillary viscosimeter (diameter of the capillaries was 0.8 mm., and the length of the capillaries was 100 mm.). The solution viscosity values were calculated according to the following formula:

$$\text{solution viscosity} = \frac{\text{Run-through time of the solution}}{\text{Run-through time of the solvent}}$$

Inasmuch as it is difficult to take samples for determination of solution viscosity of the precondensate out of the closed autoclave, test condensations can be carried out in which the process is stopped after various condensation times. The solution viscosity of the resulting precondensate in each case is thereafter determined. Under like conditions the same products are always obtained and therefore it is possible by the choice of the precondensation time to produce precondensates having the desired solution viscosity. In this manner it is also possible to influence the solution viscosity of the end product. The particular conditions that are selected in a given case will depend not only on the end product values that are desired, but also on economic considerations such as energy requirements and the duration of the reaction.

Example 1

Seven (7) kg. of dry AH salt was carefully washed with nitrogen in a 25 liter autoclave of stainless steel in which step a nitrogen pressure of 2 excess atmospheres (at room temperature) is maintained on the autoclave. The reaction mass was kept under agitation within the closed autoclave for 4 hours at 190 to 195° C. During this time the pressure rose to 15 atmospheres excess pressure. The solution viscosity of the resulting precondensate had then reached a value of 1.38. Thereafter, during the course of 30 minutes, the pressure was released down to 2 atmospheres excess pressure and washing was carried out under further agitation for 1 hour at 200 to 205° C. with 75 liters $N_2$/hour and for another 2 hours at 205° C. with 100 liters $N_2$/hour. During the cooling of the reaction mixture additional nitrogen was passed through the reaction mixture at a flow velocity of 25 liters $N_2$/hour and the reaction mixture was kept under agitation until the temperature of the reaction product had reached 150° C.

The resulting polyamide was a colorless, coarse-grained powder having a melting point of 262 to 266° C. and having a solution viscosity of 2.77. The end-group determination showed values of 5.8 m. equivalents COOH-groups and 5.45 m. equivalents $NH_2$-groups, in each case per 113.2 g. of polyamide. Converted to polymerization degree there was obtained $P(COOH)=172$ and $P(NH_2)=184$.

Example 2

The steps set forth in Example 1 were repeated up to the release of pressure of the reaction mass to 2 atmospheres excess pressure. Thereupon, with further agitation, washing was carried on for 90 minutes at 195 to 225° C. with 75 liters $N_2$/hour and additionally for 90 minutes at 225 to 215° C. with 75 liters $N_2$/hour. The conditions during the cooling were the same as those described in Example 1.

The resulting polyamide had a melting point of 263 to 265° C. and a solution viscosity of 3.07. The end-group determination showed values of 5.0 m. equivalents COOH-groups and 4.63 m. equivalents $NH_2$-groups, each per 113.2 g. of polymerizate. This corresponds to $P(COOH)=200$ and $P(NH_2)=216$.

Important for the quality of the end product is the extent of thermal damage. A measure for this is the UV absorption at a wavelength of 290 m$\mu$. If the extinction is measured of 0.5% solution in 90% formic acid against the solvent with 2 cm. layer thickness, the following values are obtained:

| Polyamide: | UV absorption |
|---|---|
| Example 1 | 0.008 |
| Example 2 | 0.014 |
| Comparative product produced by condensation of AH salt in the melt | 0.14–0.18 |

It can be shown that washing with a protective gas ($N_2$) from the start of the reaction onward, in accordance with the known process, leads to a polyamide with non-equivalent end groups. In the examples described below an experiment with nitrogen washing and an experiment without nitrogen washing is described. In the first experiment the temperature was kept extremely low in order to avoid any thermal decomposition. Further, washing was carried out at 2 atmospheres excess pressure in order to exclude any oxidizing influence through, say, air penetrating into the reaction space. Finally, the amount of nitrogen used in the experiment was only about half as great as in Examples 1 and 2.

Example 3

This example and Example 4 below are set forth for comparative purposes. In this example the AH salt was added to the autoclave in the manner described in Example 1. The contents of the autoclave were heated under agitation and 40 liters $N_2$/hour was passed into the reaction mixture at 2 atmospheres excess pressure for 7 hours at 170° C. The resulting polyamide had a solution viscosity of 1.63. The end-group determination of the product showed values of 14.6 m. equivalents COOH-groups and 10.2 m. equivalent $NH_2$ groups. This corresponded to $P(COOH)=69$ and $P(NH_2)=98$.

Example 4

After the autoclave was prepared as described in Example 1, the reaction mass was heated in the closed autoclave under agitation without passing in of nitrogen for 7 hours at 190° C. In the process a constant pressure of 15 atmospheres was maintained. Within the course of 30 minutes the pressure was released to 2 atmospheres and thereupon with a closed autoclave and without agitation and nitrogen washing a cooling was carried out. The resulting polyamide had a solution viscosity of 1.38. The end-group determination provided values of 36.2 m. equivalents COOH-groups and 36.5 m. equivalents $NH_2$-groups, corresponding to $P(COOH)=27.6$ and $P(NH_2)=27.4$.

A comparison of the above examples makes it clear that the success of the subject process depends upon maintaining particular conditions during the reaction. More particularly, it is necessary that the process be divided into a precondensation stage in a closed vessel under pressure and into an end condensation process utilizing nitrogen washing.

As was indicated above, a variety of polyamide-forming monomers may be used in the process. In addition to adipic acid and hexamethylene diamine or AH salt, other dicarboxylic acids such as sebacic acid, pimelic acid, suberic acid, oxalic acid, glutaric acid, azelaic acid, and terephthalic acid, and other diamines such as tetramethylene diamine, pentamethylene diamine, octamethylene diamine, decamethylene diamine, piperazine diamine, and p-xylene diamine in various combinations as well as amino carboxylic acids such as 11-aminoundecanoic acid can be employed in the process.

Obviously many modifications and variations of the invention as hereinbefore set forth may be made without departing from the spirit and scope thereof, and therefore only such limitations should be imposed as are indicated in the appended claims.

I claim:

1. In a process for the production of polyamides from dicarboxylic acids and diamines, from salts of dicarboxylic acids and diamines, and from aminocarboxylic acids, the improvement which comprises: maintaining the polyamide-forming monomers in a closed vessel under agitation and under a nitrogen atmosphere at a temperature below the melting point of the monomers until a maximum pressure of 15 atmospheres sets in and a precondensate is formed having a solution viscosity of from about 1.30 to about 1.50 measured in 1% solution in 90% formic acid at 25° C. and thereafter releasing the pressure built up in the closed vessel to a pressure slightly above atmospheric pressure while heating the precondensate to a temperature of from about 20 to about 60° C. below the melting temperature of the end condensation product and continuing the heating of said reaction mixture for from about 1 to about 5 hours while passing nitrogen through said reaction mixture.

2. In a process for the production of polyamides from dicarboxylic acids and diamines, from salts of dicarboxylic acids and diamines, and from aminocarboxylic acids, the improvement which comprises: maintaining the polyamide-forming monomers in a closed vessel under agitation and under a nitrogen atmosphere at a temperature below the melting point of the monomers until a maximum pressure at 15 atmospheres sets in and a precondensate is formed having a solution viscosity of from about 1.30 to about 1.50 measured in 1% solution in 90% formic acid at 25° C. and thereafter releasing the pressure built up in the closed vessel to a pressure slightly above atmospheric pressure while heating the precondensate to a temperature of from about 20 to about 60° C. below the melting temperature of the end condensation product and continuing the heating of said reaction mixture for from about 1 to about 5 hours while passing nitrogen through said reaction mixture, and allowing said condensation product to cool while nitrogen is introduced into the reaction mixture under agitation.

References Cited
UNITED STATES PATENTS 3,232,909   2/1966   Werner _____ 260—78

WILLIAM H. SHORT, *Primary Examiner.*

H. D. ANDERSON, *Assistant Examiner.*

UNITED STATES PATENT OFFICE
CERTIFICATE OF CORRECTION

Patent No. 3,379,696　　　　　　　　　　　　　April 23, 1968

Fritz Wiloth

It is certified that error appears in the above identified patent and that said Letters Patent are hereby corrected as shown below:

Column 1, line 23, "solid base" should read -- solid phase --. Column 6, line 2, "pressure at" should read -- pressure of --.

Signed and sealed this 13th day of January 1970.

(SEAL)
Attest:

Edward M. Fletcher, Jr.　　　　　　　　　　WILLIAM E. SCHUYLER, JR.
Attesting Officer　　　　　　　　　　　　　　Commissioner of Patents